(12) United States Patent
Subrahmanyam

(10) Patent No.: US 7,159,753 B2
(45) Date of Patent: *Jan. 9, 2007

(54) WIRE BODY BASED WELDING REPRESENTATION

(75) Inventor: Somashekar Ramachandran Subrahmanyam, Farmington Hills, MI (US)

(73) Assignee: Autodesk, Inc., San Rafael, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 10/644,629

(22) Filed: Aug. 19, 2003

(65) Prior Publication Data

US 2005/0040208 A1 Feb. 24, 2005

(51) Int. Cl.
B23K 20/00 (2006.01)
B23K 31/12 (2006.01)
G06F 19/00 (2006.01)

(52) U.S. Cl. .............. 228/102; 228/103; 228/104; 700/212

(58) Field of Classification Search ............ 228/102, 228/103, 104; 700/212
See application file for complete search history.

(56) References Cited

U.S. PATENT DOCUMENTS

| | | | |
|---|---|---|---|
| 4,561,059 A * | 12/1985 | Davis et al. | 700/212 |
| 4,877,940 A * | 10/1989 | Bangs et al. | 219/124.34 |
| 5,040,125 A * | 8/1991 | Okumura et al. | 700/212 |
| 5,774,359 A | 6/1998 | Taneja | |
| 6,249,718 B1 | 6/2001 | Gilliland et al. | |
| 6,392,193 B1 | 5/2002 | Mallenahalli et al. | |
| 6,392,645 B1 | 5/2002 | Han et al. | |
| 6,445,338 B1 | 9/2002 | Ohkubo | |
| 6,489,957 B1 | 12/2002 | Han et al. | |
| 6,515,258 B1 * | 2/2003 | Corby et al. | 219/125.1 |
| 6,583,386 B1 * | 6/2003 | Ivkovich | 219/130.01 |
| 6,629,011 B1 * | 9/2003 | Calderon et al. | 700/119 |
| 6,697,701 B1 * | 2/2004 | Hillen et al. | 700/212 |
| 6,795,778 B1 * | 9/2004 | Dodge et al. | 702/34 |
| 6,801,217 B1 | 10/2004 | Andersson | |
| 6,912,447 B1 * | 6/2005 | Klimko et al. | 700/212 |
| 7,050,960 B1 | 5/2006 | Hoelle et al. | |
| 2004/0010342 A1 * | 1/2004 | Thelen | 700/245 |
| 2004/0122550 A1 * | 6/2004 | Klimko et al. | 700/212 |
| 2004/0129759 A1 * | 7/2004 | Rouault et al. | 228/102 |

OTHER PUBLICATIONS

Parametric Technology Corporation, "Pro/Engineer 2001, Pro/Welding Topic Collection".
Joe Greco, "A Visual Guide to Solid Edge 10," http://mcadvision.ibsystems.com/October2001/case_full.php.

(Continued)

Primary Examiner—Lynne R. Edmondson
(74) Attorney, Agent, or Firm—Fish & Richardson P.C.

(57) ABSTRACT

A computing environment is provided with the ability to at least contribute to generate a representation for a weld bead to be used to weld a number of components of an article of manufacture together at one or more edges of the components in the manufacturing of the article outside the computing environment, including the ability to generate an initial set of one or more data representations of an initial set of one or more wire bodies based on one or more data representations of the one or more edges respectively to synthesize one or more corresponding wire bodies for the one or more edges, and the ability to generate a final data representation of a final wire body based on the initial set of one or more data representations of the initial set of one or more wire bodies of the one or more edges.

30 Claims, 7 Drawing Sheets

OTHER PUBLICATIONS

Subrashekar, et al., "Feature Attributes and Their Role in Product Modeling," Solid Modeling '95, Salt Lake City, Utah, 1995.

Computer & Automation Institute, "PROARC, No. 7831, CAD-Based Programming System for Arc Welding Robots in One-Off Production Runs," ESPRIT, Jan. 16, 2001.

Wang, et al., "The Design and Fabrication of Welded Tubular Joints Using Solid Modeling Techniques," 2nd ACM Solid Modeling, 1993.

* cited by examiner

Figur 4

WIRE BODY BASED WELDING REPRESENTATION

BACKGROUND

Advances in computing technology have made possible the provision of computer-aided-design (CAD) software to support the design and manufacturing of articles. Modern CAD software not only includes sketching or schematic features, but also solid modeling and other advanced features.

Manufacturing of articles often involves the welding of two or more components of an article into one single piece. A variety of welding types may be employed, including but are not limited to flange edge, butt, double flange, flange corner, single flange, square groove, square butt, and so forth. Accordingly, it is desirable for CAD software to support modeling of welding.

A few commercial CAD systems offer support for representing welds. Externally, the support includes highlighting and/or labeling of the edges of the components involved. However, the method in which this functionality is provided is proprietary, and not known. In particular, it is unknown whether the welds are separately modeled or represented, and if so, how they are modeled/represented.

BRIEF DESCRIPTION OF THE DRAWINGS

Embodiments of the present invention will be described referencing the accompanying drawings in which like references denote similar elements, and in which.

DETAILED DESCRIPTION OF EMBODIMENTS OF THE INVENTION

Embodiments of the present invention include, but are not limited to, methods to model/represent welds in a computing environment, instructions implementing or contributing to the implementation of the methods, components, devices and systems incorporated with one or more implementations.

In the following description, various aspects of embodiments of the present invention will be described. However, it will be apparent to those skilled in the art that embodiments of the present invention may be practiced with only some or all aspects described. For purposes of explanation, specific numbers, materials and configurations are set forth in order to provide a thorough understanding of these embodiments of the present invention. However, it will be apparent to one skilled in the art that various embodiments of the present invention may be practiced without the specific details. In other instances, well-known features are omitted or simplified in order not to obscure the disclosed embodiments of the present invention.

Various operations will be described as multiple discrete operations in turn, in a manner that is helpful in understanding these embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
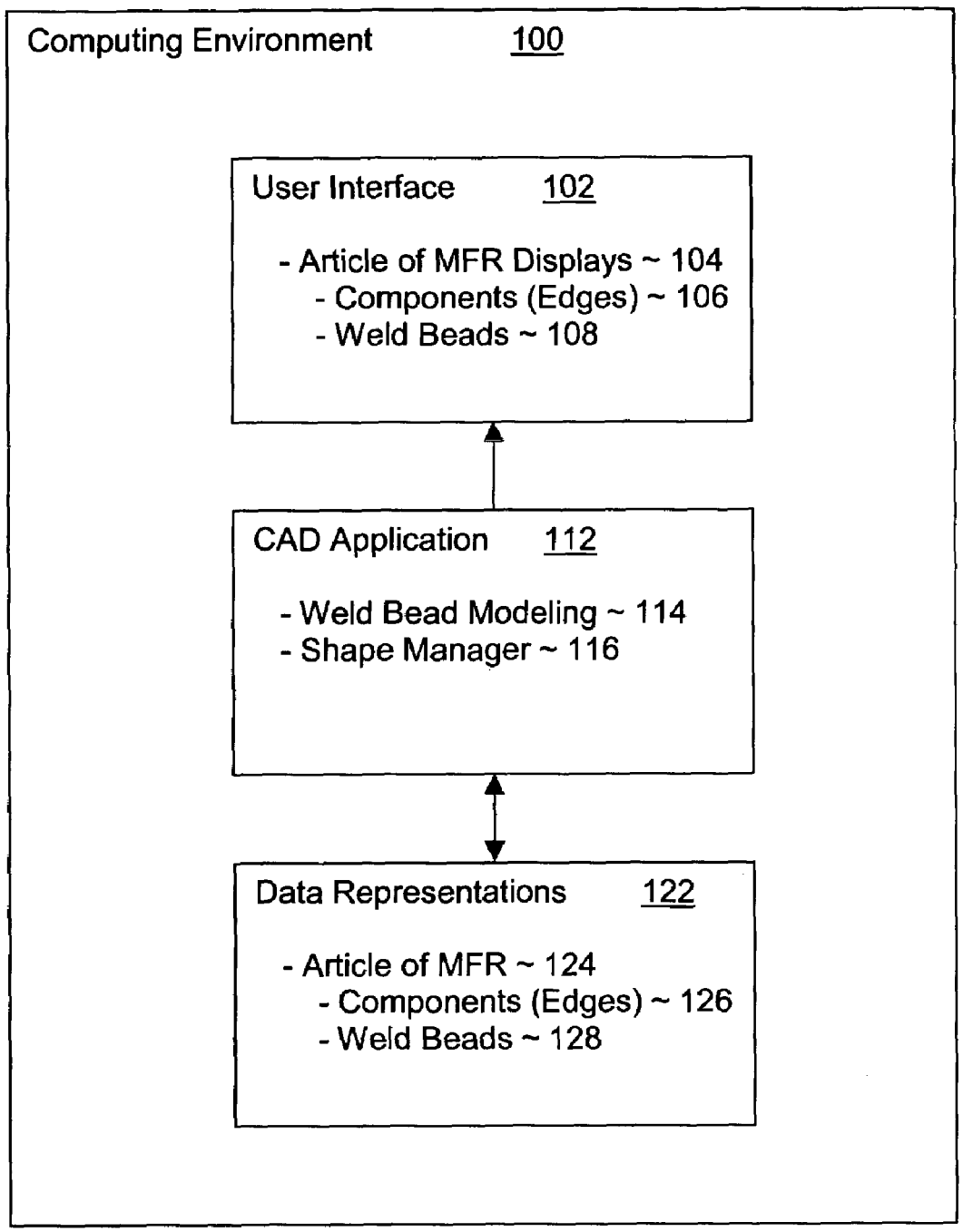
FIG. 1 illustrates a computing environment incorporated with one embodiment of the present invention.

Referring now to FIG. 1 wherein a computing environment incorporated with one embodiment of the present invention is illustrated. As shown, for the embodiment, computing environment 100 includes CAD application 112, having associated user interface 102 and data representations 122. CAD application 112 includes a number of CAD functions, in particular, weld bead modeling function 114 and shape manager 116. The various CAD functions, including weld bead modeling function 114 and shape manager 116 are equipped to create, process and delete various data representations 122 of features of articles of manufacture, including in particular, data representations 126 of their components and edges, and data representations 128 of weld beads. Resultantly, articles of manufactures may be modeled 124, and displayed 104 in user interface 102, including their components, edges and weld beads, 106 and 108.

Except for weld bead modeling function 114, CAD application 112 including shape manager 116 represent a broad range of these elements, and may be implemented in a number of manners. For example, CAD application 112 may be implemented using the Inventor® 7 (also referred to as Autodesk Inventor Series) mechanical design software product available from Autodesk Inc. of San Rafael, Calif.

In alternate embodiments, CAD application 112 including shape manager 116 may be implemented with other CAD applications with an integral geometric modeler, or other CAD applications employing a complementary standalone geometric modeler instead.

Similarly, data representations 122 may be implemented in a variety of manners, including but are not limited to link lists, relational tables, data objects, and other data organizations/structures of the like. Likewise, user interface 102 may be implemented in any one of a number of manners, in particular, a graphical manner.

Figure 2A:
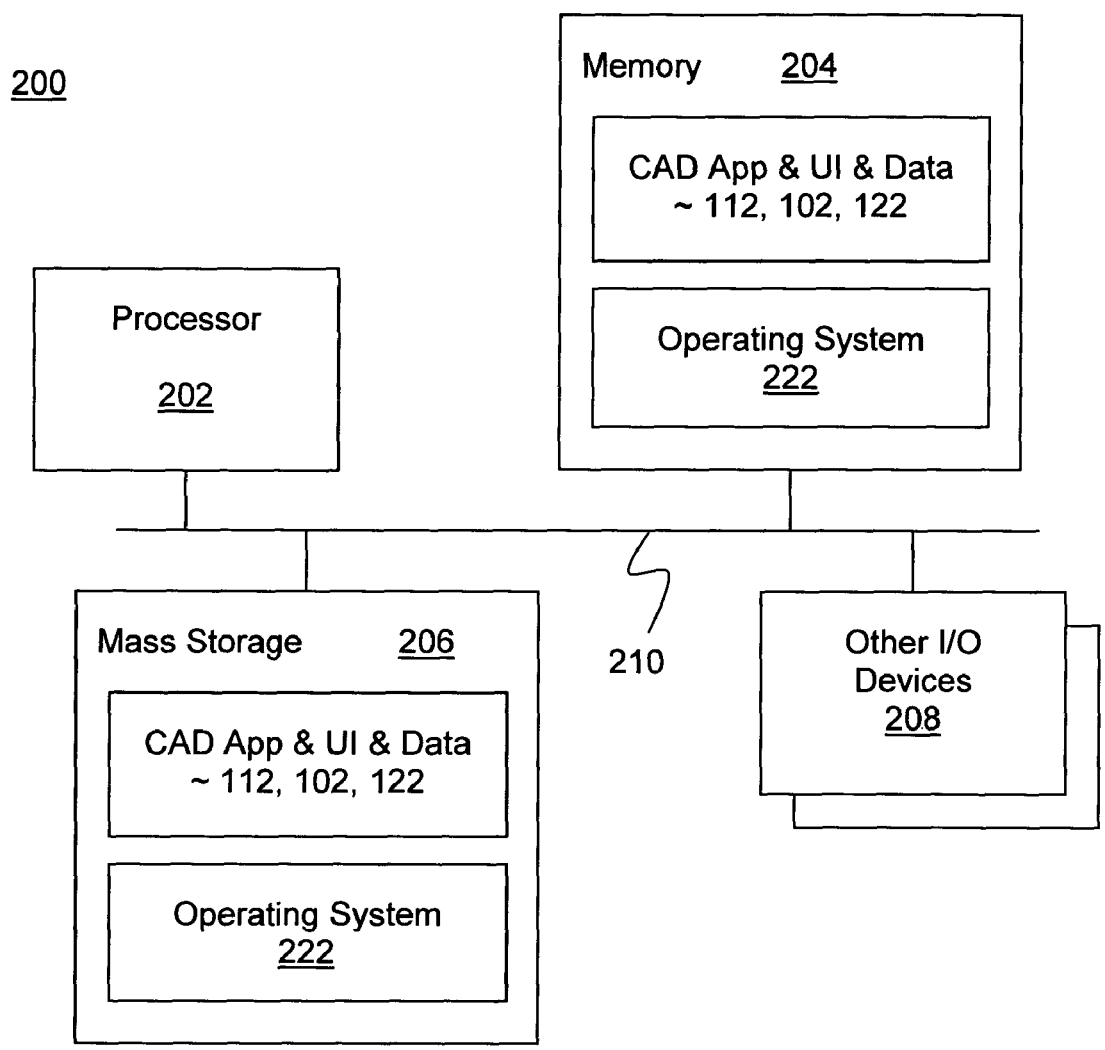
FIGS. 2a–2b illustrate two examples of computing environments of FIG. 1.

FIG. 2a illustrates one embodiment of computing environment 100 of FIG. 1. As illustrated, for the embodiment, computing environment 100 is a computing device 200 incorporated with one embodiment of the present invention. More specifically, computing device 200 includes processor 202, memory 204, mass storage device 206 and other I/O devices 208, coupled to each other via bus 210, as shown.

Memory 204 and mass storage device 206 include a transient working copy and a persistent copy of CAD application 112, including associated user interface 102 and data representations 122 of FIG. 1. Further, for the embodiment, memory 204 and mass storage device 206 include a transient working copy and a persistent copy of operating system 222, providing a number of system services to CAD application 112.

Processor 202, memory 204, mass storage 206, I/O devices 208, and bus 210 represent a broad range of such elements.

In other words, except for CAD application 112 endowed with weld bead modeling function 114, computing device 200 represent a broad range of such devices, including but are not limited to a server, a desktop computer, a computing tablet, a laptop computer, a palm sized personal assistant, a pocket PC, or other computing devices of the like.

Figure 2B:

FIG. 2b illustrates another embodiment of computing environment 100 of FIG. 1. As illustrated, for the embodiment, computing environment 100 is a networked computing environment 250 including client device 252 and server 256 coupled to each other via network 254.

Collectively, client device 252 and server 256 are equipped with an embodiment of CAD application 112, including associated user interface 102 and data representations 122. In other words, CAD application 112, including associated user interface 102 and data representations 122 are distributively disposed on client device 252 and server 256. In various embodiments, client device 252 and server 256 may be computing device 200 of FIG. 2a.

Similarly, network 254 represents a broad range of local area, wide area, private and/or public networks. An example of a public network is the Internet.

Figure 3:
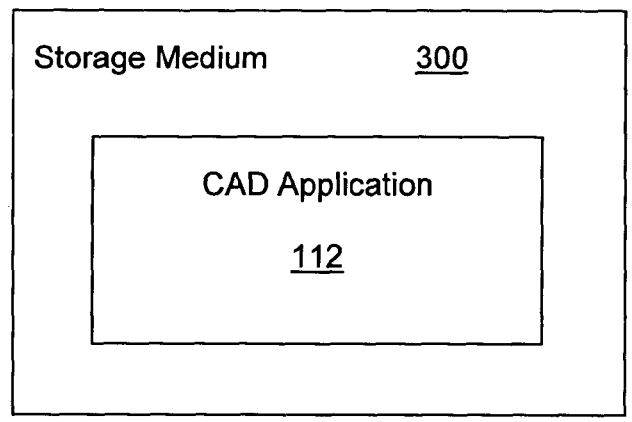
FIG. 3 illustrates an example machine readable article having instructions implementing all or portions of the CAD application of FIG. 1.

FIG. 3 illustrates a machine readable article suitable for use to store executable instructions implementing all or portions of the CAD application 112 of FIG. 1, including weld bead modeling function 114, in accordance with one embodiment. For the embodiment, the machine readable article includes storage medium 300 and instructions implementing all or portions of CAD application 112, including weld bead modeling function 114, stored therein. The stored instructions may be used to program an apparatus, such as computing device 200 of FIG. 2a, or client device 252 and/or server 254 of FIG. 2b.

In various embodiments, the instructions may be C or C++ programming language instructions or other system programming language instructions of the like. Further, storage medium 300 may be a diskette, a tape, a compact disk (CD), a digital versatile disk (DVD), a solid state storage devices, or other electrical, magnetic and/or optical storage devices of the like.

Figure 4:
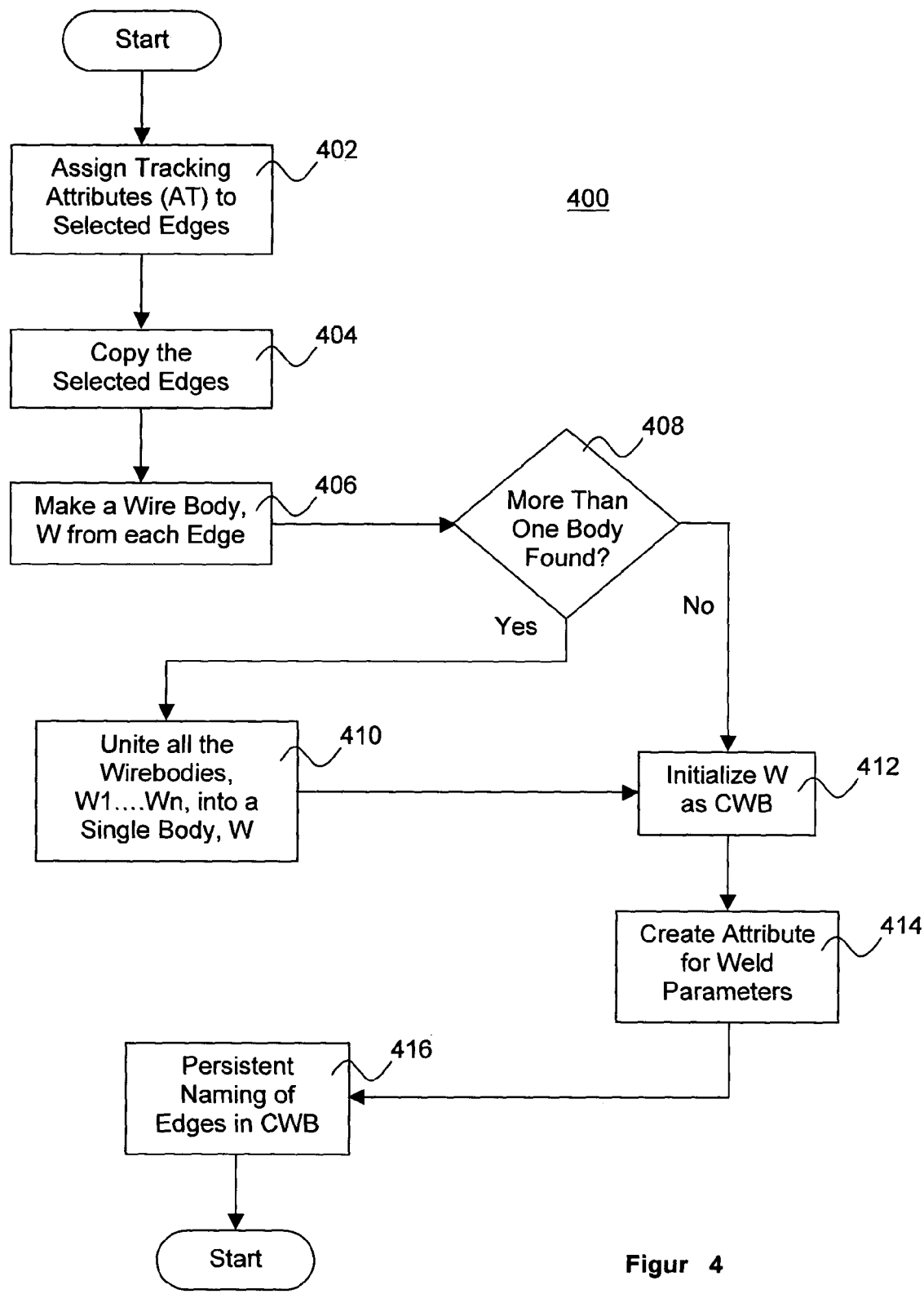
FIG. 4 illustrates one embodiment of the operational flow of the weld bead modeling function of FIG. 1.

FIG. 4 illustrates one embodiment of the operational flow of weld bead modeling function 114 of FIG. 1. The embodiment assumes CAD application 112 includes the functions for facilitating entry into a welding modeling mode of operation, where on entry, weld bead modeling function 114 is invoked. Further, CAD application 112 includes the functions for facilitating selection of the edges of the components of an article of manufacture involved in a particular welding operation to weld the components of the article together during manufacturing. For example, CAD application 112 may include support to facilitate a user in making the selection using a cursor control device, such as a mouse, trackball, a touch pad and so forth. The support may leverage user input device services provided e.g. by operating system 222.

Continuing to refer on FIG. 4, as illustrated, on selection, weld bead modeling function 114 first assigns tracking attributes (AT) to the selected edges of the components of the article of manufacture, where welding is to be performed when manufacturing the article, block 402.

In various embodiments, AT includes attributes specifying that the attributes are to be propagated whenever a split, copy or merge operation is performed on each of the selected edges. AT's split, copy and merge behaviors are specified such that, during a split or copy operation, which results in an old entity and a new entity, a copy of the attribute on the old entity propagates itself to the newly formed entity. During a merge operation of two entities, all the original attributes from the two entities are retained on the merged entity.

Further, in various embodiments, AT includes information that allows the split, copied or merged versions of the selected edges to be tracked back to the original selected edges. In various embodiments, AT includes a unique index, i, which is incremented for each of the selected edges processed.

Note that all operations, including any split, copy or merge operations, performed on an edge or other features of a component within computing environment 100, in substance are performed on data representations 122 of the edge/feature of the component. For ease of understanding, further description may not be burdened with the repeated clarification. However, the description should be so read, unless the context clearly indicates otherwise.

Next, at block 404, weld bead modeling function 114 copies the selected edges, replicating their data representations.

At block 406 weld bead modeling function 114 causes a wire body (or more specifically, a data representation of a wire body) to be created for each selected edge. For the embodiment, weld bead modeling function 114 causes a wire body (or More specifically, a data representation of a wire body) to be created for each selected edge by calling shape manager 116 to perform the actual creation.

At block 408, weld bead modeling function 114 determines for the instance weld to be modeled, whether there is one, or more than one wire body involved.

If more than one wire body is involved, then weld bead modeling function 114 further causes a combined wire body (more specifically, a combined data representation) to be formed, by uniting the one or more wire bodies (more specifically, their data representations) together, block 410. For the embodiment, weld bead modeling function 114 causes the combined wire body (or more specifically, a combined data representation of the combined wire body) to be created by calling shape manager 116 to perform the unite operation.

Upon either determining if, there is only one wire body involved or having merged all the wire bodies into a combined wire body, weld bead modeling function 114 initializes the data representation of this final wire body as the data representation or model of the wire bead, block 412. The data representation or model of a "weld bead" is also referred to as "cosmetic weld bead" or "virtual weld bead". For the present application, including the claims, these terms are synonymous, unless the context clearly indicates to the contrary.

Upon initializing the final united wire body as the data representation of the weld being modeled, weld bead modeling function 114 creates various attributes to record the applicable weld parameters, based on user inputs, block 414. The nature of the parameters is dependent on the type of the weldment. For example, in the case of a V Groove weld, the parameters may include a gap size, and an angle size between the applicable components.

Upon creating the welding parameter attributes, weld bead modeling function 114 causes each edge of the weld bead to be persistently named, block 416. In various embodiments, persistent naming comprises persistent attribute assignment of a name to each edge.

Figure 5:
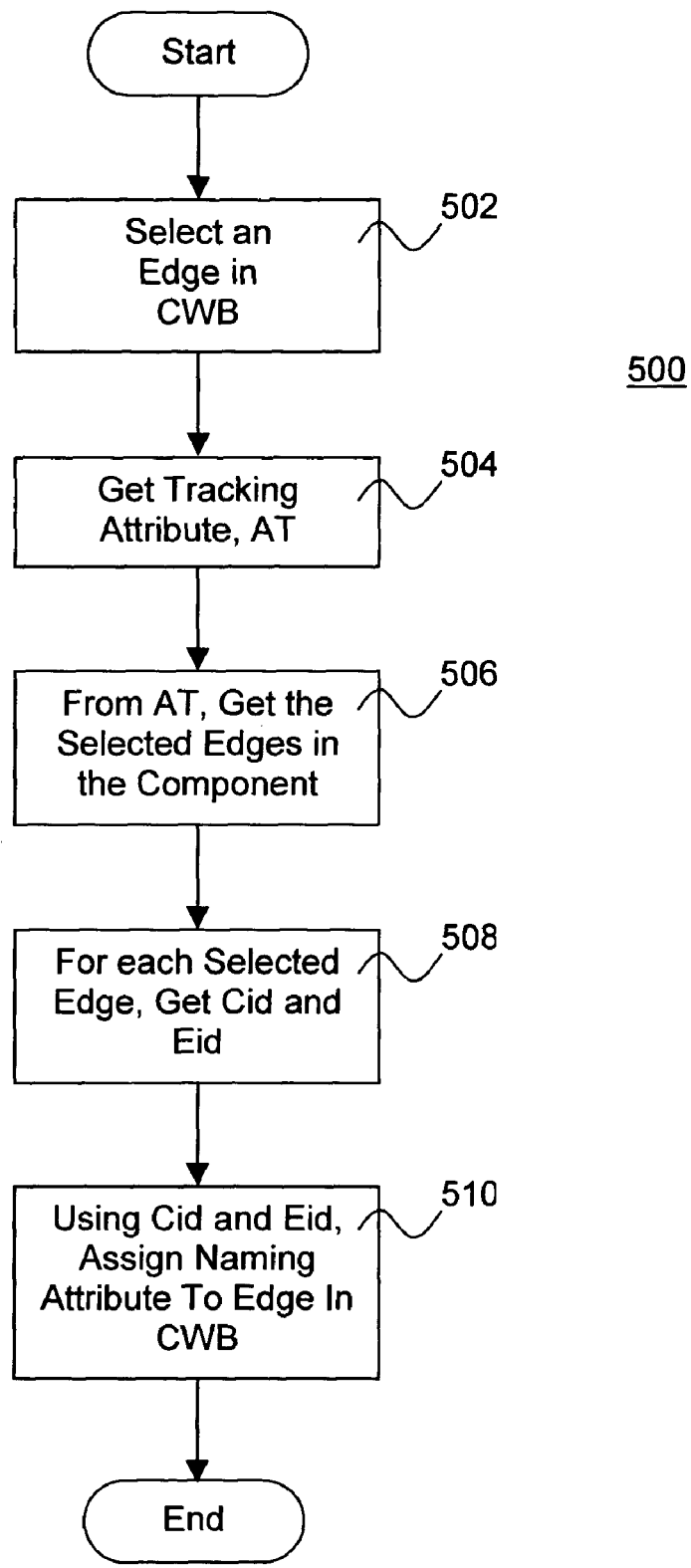
FIG. 5 illustrates one embodiment of the operational flow of the persistent attribute assignment of a name operation of FIG. 4.

FIG. 5 illustrates one embodiment of the persistent attribute assignment of a name operation of FIG. 4. As illustrated, for the embodiment, weld bead modeling function 114 first selects an edge of the weld bead, block 502. Then, weld bead modeling function 114 retrieves the AT of the selected edge of the weld bead, block 504. Next, using the AT, weld bead modeling function 114 locates the edges of the components that contributed to the selected edge of the weld bead, block 506. Note that an edge of a weld bead may result from more than one selected edge of the components to be welded together.

At this point, weld bead modeling function 114 retrieves for each edge of the components involved, one or more identifications identifying the edge(s) and the component(s) to which the edge(s) is a part, block 508. In various embodiments, two identifications, a component identification ($C_{id}$) and an edge identification ($E_{id}$), are retrieved for each selected edge.

Finally, weld bead modeling function 114 creates a persistent name attribute, block 510, based on the retrieved one or more identifications identifying the edges, and the components to which the edges are a part.

Thus, by virtue of the employment of wire bodies, the data representation of a modeled weld bead under the disclosed embodiments of the present invention is light-weight. When compared to other approaches, e.g. a 3-D solid modeling approach, substantial efficiency gains may be realized. Moreover, the wire body representation, in essence, is a complete representation, as it captures the geometry, topology and all the weld parameters. Moreover, by virtue of the persistent naming, the data representation of a weld bead may be efficiently processed independent of the components' edges that result in corresponding edges in the wire body.

Further, the disclosed embodiments avoid the need to use complex shape generation algorithms that are used in the solid weld bead approach. When implemented using Autodesk Inventor, the disclosed embodiments comprise essentially two "actions", whereas a solid weld bead approach involves as many as six "actions".

FIG. 6a–6d illustrate an example application of CAD application 112 having weld bead modeling function 114. The example application assumes the manufacturing of an example article involves the welding of angle iron 602 to base plate 604 (see FIG. 6a).

Figure 6A:
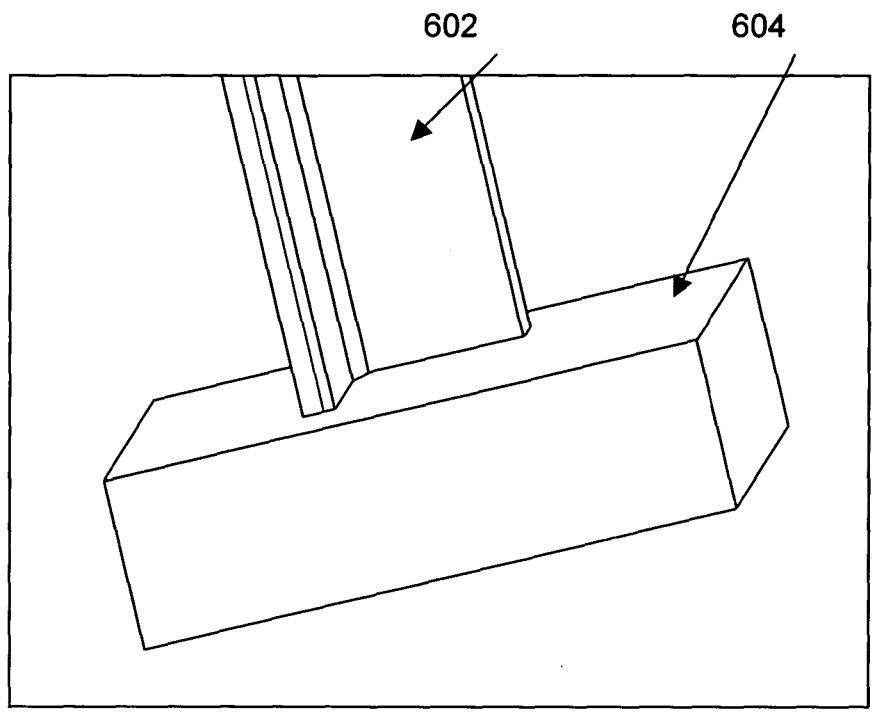
FIGS. 6a–6d illustrate an example application of one embodiment of the present invention.
Figure 6B:
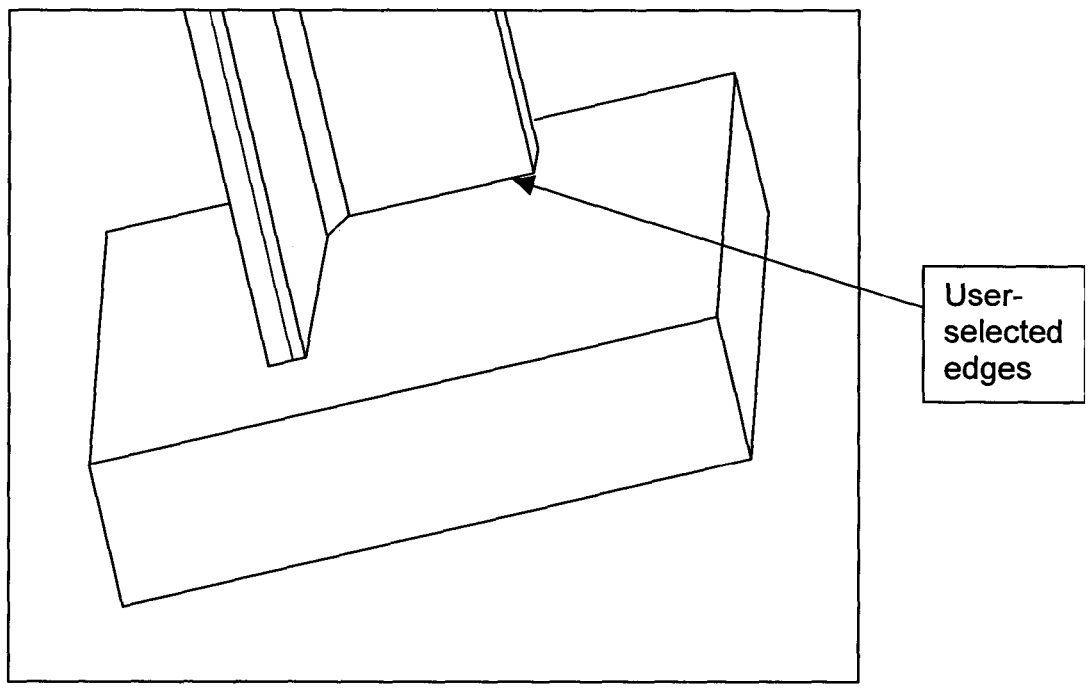
Figure 6C:
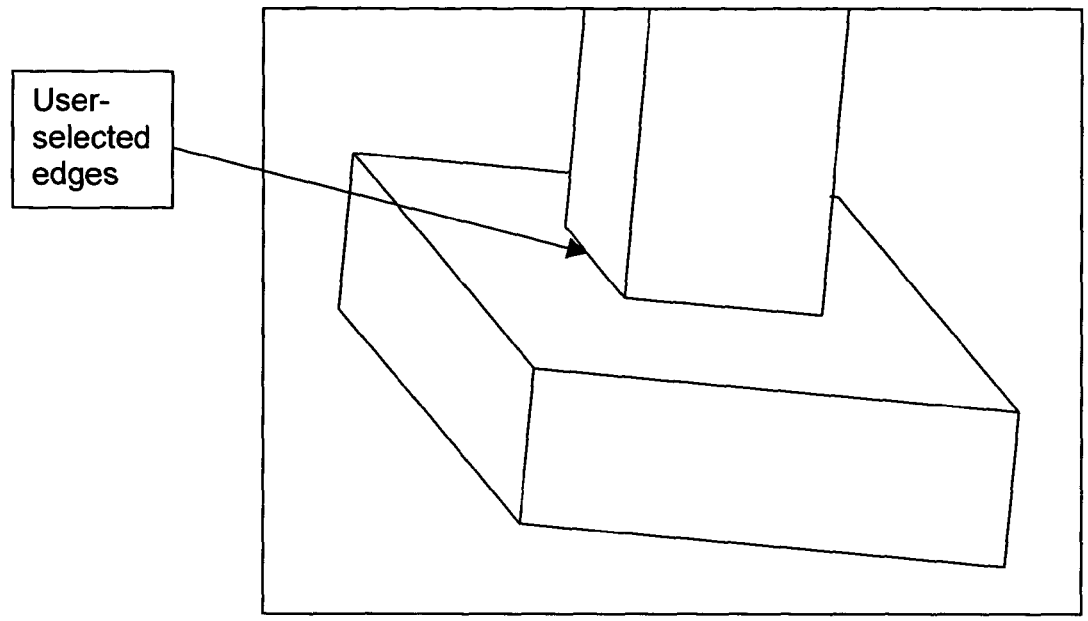

Accordingly, CAD application 112 may be employed to first facilitate the selection, e.g. by a user, the edges of angle iron 602, where the welding is to be performed. The selected edges are shown in FIGS. 6b and 6c.

Figure 6D:
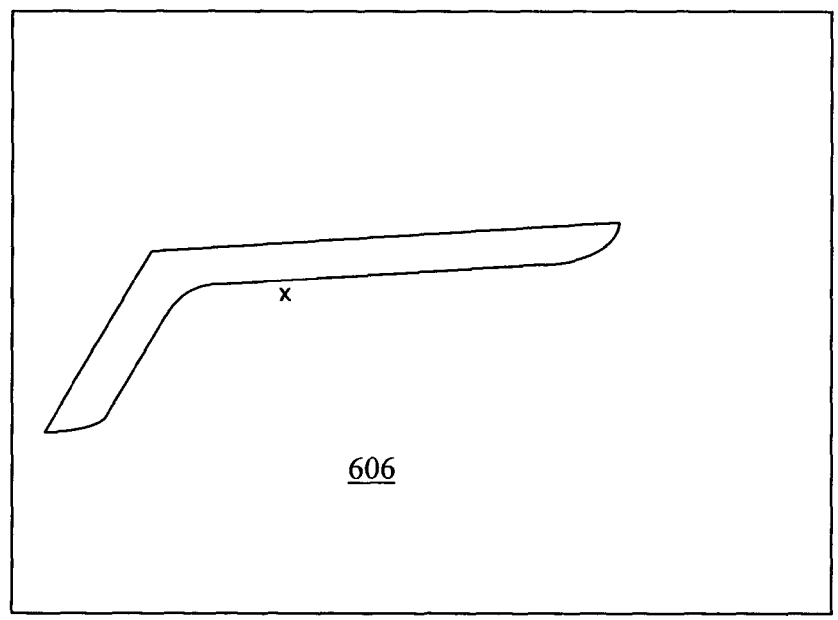

In response, the operations of FIG. 4–5 are performed, resulting in the creation of a wire body based data representation 606 of the weld (see FIG. 6d).

As illustrated, representation 606 is light-weight, and involves only 1 lump, 1 shell, 1 wire, 0 face, 0 loop, 9 co-edges, 9 edges and 9 vertices. In contrast, a comparable solid weld bead representation is likely to have 1 lump, 1 shell, 19 faces, 20 loops, 90 co-edges, 45 edges, and 27 vertices.

Thus, it can be seen from the above descriptions, embodiments of a novel method to represent welds have been described. While the novel method has been described in terms of the foregoing embodiments, those skilled in the art will recognize that the method is not limited to the embodiments described. The method may be practiced with modifications and alterations within the spirit and scope of the appended claims.

Accordingly, the description is to be regarded as illustrative instead of restrictive.

What is claimed is:

1. In a computing environment, a method to represent a weld bead to be used to weld one or more components of an article of manufacture at one or more edges of the one or more components in the manufacturing of the article outside the computing environment, the method comprising:
   selecting one or more edges of the one or more components of the article of manufacture to be welded;
   generating a data representation of a wire body for each of the one or more selected edges; and
   generating a data representation of a final wire body based on the data representations of a wire body for each of the one or more selected edges, where the final wire body represents the weld bead.

2. The method of claim 1, wherein the method further comprises assigning one or more tracking attributes to the one or more selected edges within the computing environment, where the tracking attributes specify that at least one or more of the tracking attributes are to be propagated during each of a split, copy or merge operation performed within the computing environment on the selected edge.

3. The method of claim 2, wherein the one or more tracking attributes include a unique index, i, incremented for each edge.

4. The method of claim 1, wherein the method further comprises replicating one or more of the data representations of a wire body for one or more of the selected one or more edges.

5. The method of claim 1, wherein generating a data representation of a wire body for each of the one or more selected edges comprises calling a shape manager of the computing environment to synthesize a wire body for one of the one or more edges.

6. The method of claim 1, wherein the method further comprises creating within the computing environment, welding parameters of the weld bead.

7. The method of claim 1, wherein the method further comprises facilitating persistent attribute assignment within the computing environment, including persistent attribute assignment of a name for each of the one or more selected edges.

8. The method of claim 7, wherein the persistent attribute assignment comprises retrieving from a source within the computing environment, one or more identifications identifying an edge of the one or more edges of the components of an article of manufacture to be welded.

9. In a computing environment, a method of operation comprising:
   selecting within the computing environment, an edge of a weld bead whose data representation is formed based on one or more data representations of one or more edges of one or more components of an article of manufacture to be welded together using the weld bead at the one or more edges when manufacturing the article;
   retrieving from a source within the computing environment, one or more identifications identifying both the one or more edges of the one or more components and the one or more components;
   forming within the computing environment, a name attribute based at least in part on the retrieved one or more identifications; and
   assigning within the computing environment, the name attribute to the selected edge of the weld bead.

10. The method of claim 9, wherein
   the retrieving is repeated for each edge of each component associated with the edge of the weld bead; and
   the forming is based at least in part on all the retrieved identifications.

11. The method of claim 9, wherein the selecting, retrieving, forming and assigning are repeated for each edge of the weld bead.

12. A machine readable article comprising
   a machine readable storage medium; and
   a plurality of machine executable instructions stored in the machine readable storage medium, with the instructions designed to enable an apparatus to select one or more edges of one or more components of an article of manufacture to be welded;

generate a data representation of a wire body for each of the one or more selected edges; and generate a data representation of a final wire body based on the data representations of a wire body for each of the one or more selected edges.

13. The machine readable article of claim 12, wherein the instructions are further designed to generate within the apparatus, a final data representation of a final wire body by if in the generating a data representation of a wire body for each of the one or more selected edges step only one data representation of a wire body is generated, then using said data representation of a wire body as the data representation of the final wire body, else, uniting the more than one data representations to form the data representation of the final wire body.

14. An apparatus comprising:

a storage medium having stored therein a plurality of instructions designed to enable the apparatus to select one or more edges of one or more components of an article of manufacture to be welded;

generate a data representation of a wire body for each of the one or more selected edges; and generate a data representation of a final wire body based on the data representations of a wire body for each of the one or more selected edges; and a processor coupled to the storage medium to execute the instructions.

15. The machine readable article of claim 12, wherein the instructions are further designed to assign one or more tracking attributes to the one or more selected edges within the apparatus, where the tracking attributes specify that at least one or more of the tracking attributes are to be propagated during each of a split, copy or merge operation performed within the apparatus on the selected edge.

16. The machine readable article of claim 12, wherein the instructions are further designed to generate a data representation of a wire body for each of the one more selected edges by calling a shape manager of the apparatus to synthesize a wire body for one of the one or more edges.

17. The apparatus of claim 14, wherein the instructions are further designed to perform the generating within apparatus, a final data representation of a final wire body by if in the generating a data representation of a wire body for each of the one or more selected edges step only one data representation of a wire body is generated then using said data representation of a wire body as the data representation of the final wire body, else, uniting the more than one data representations to form the data representation of the final wire body.

18. The method of claim 1, where generating a data representation of a final wire body comprises:

if in the generating a data representation of a wire body for each of the one or more selected edges step only one data representation of a wire body is generated, then using said data representation of a wire body as the data representation of the final wire body, else, uniting the more than one data representations to form the data representation of the final wire body.

19. The machine readable article of claim 12, wherein the instructions are further designed to create within the apparatus, welding parameters of the weld bead.

20. The machine readable article of claim 12, wherein the instructions are further designed to facilitate persistent attribute assignment within the apparatus, including persistent attribute assignment of a name for each of the one or more selected edges.

21. The apparatus of claim 14, wherein the instructions are further designed to enable the apparatus to assign one or more tracking attributes to the one or more selected edges within the apparatus, where the tracking attributes specify that at least the one or more of the tracking attributes are to be propagated during each of a split, copy or merge operation performed within the apparatus on the selected edge.

22. The apparatus of claim 21, wherein the one or more tracking attributes include a unique index, i, incremented for each edge.

23. The apparatus of claim 21, wherein the instructions are further designed to enable the apparatus to replicate one or more of the selected one or more edges.

24. The apparatus of claim 14, wherein the apparatus further comprises a shape manager, and the instructions are further designed to generate a data representation of a wire body for each of the one or more selected edges by calling the shape manager to synthesize a wire body for one of the one or more edges.

25. The apparatus of claim 14, wherein the instructions are further designed to create within the apparatus, welding parameters of the weld bead.

26. The apparatus of claim 14, wherein the instructions are further designed to facilitate persistent attribute assignment within the apparatus, including persistent attribute assignment of a name for each of the one or more selected edges.

27. The apparatus of claim 26, wherein the instructions are further designed to perform the persistent attribute assignment by retrieving one or more identifications identifying an edge of the one or more edges of the components of an article of manufacture to be welded.

28. An apparatus comprising:

a storage medium having stored therein a plurality of instructions designed to enable the apparatus to select within the apparatus an edge of a weld bead which data representation is formed based on one or more data representations of one or more edges of one or more components of an article of manufacture to be welded using the weld bead at the one or more edges when manufacturing the article, retrieve from a source within the apparatus, one or more identifications identifying both the one or more edges of the one or more components and the one or more components, form a name attribute within the apparatus, based at least in part on the retrieved one or more identifications, and assign within the apparatus, the name attribute to the selected edge of the weld bead; and one or more processors coupled to the storage medium to execute the instructions.

29. The apparatus of claim 28, wherein the instructions are further designed to repeat the retrieving for each edge of each component associated with the edge of the weld bead; and perform the forming based at least in pert on all the retrieved identifications.

30. The apparatus of claim 29, wherein the instructions are further designed to repeat the selecting, retrieving, forming and assigning for each edge of the weld bead.

* * * * *